United States Patent
D'Souza (10) Patent No.: US 12,362,913 B2
(45) Date of Patent: Jul. 15, 2025

(54) METHOD AND SYSTEM FOR SECURE DISTRIBUTION OF SYMMETRIC ENCRYPTION KEYS USING QUANTUM KEY DISTRIBUTION (QKD)

(71) Applicant: Honeywell Limited Honeywell Limitée, Mississauga (CA)

(72) Inventor: Ian D'Souza, Waterloo (CA)

(73) Assignee: Honeywell Limited Honeywell Limitée, Mississauga (CA)

( * ) Notice: Subject to any disclaimer, the term of this patent is extended or adjusted under 35 U.S.C. 154(b) by 169 days.

(21) Appl. No.: 18/097,311

(22) Filed: Jan. 16, 2023

(65) Prior Publication Data

US 2024/0340160 A1    Oct. 10, 2024

Related U.S. Application Data

(60) Provisional application No. 63/320,500, filed on Mar. 16, 2022.

(51) Int. Cl.
*H04L 9/08* (2006.01)
*H04L 9/14* (2006.01)
*H04L 9/40* (2022.01)

(52) U.S. Cl.
CPC .......... *H04L 9/0822* (2013.01); *H04L 9/0852* (2013.01)

(58) Field of Classification Search
CPC ............................ H04L 9/0822; H04L 9/0852
See application file for complete search history.

(56) References Cited

U.S. PATENT DOCUMENTS 7,181,011 B2    2/2007  Trifonov
9,509,506 B2   11/2016  Hughes et al.
(Continued)

FOREIGN PATENT DOCUMENTS

KR          101767939 B1      8/2017
WO   WO-2021090026 A1 *  5/2021   ........... H04B 10/118
WO   WO-2022211731 A1 * 10/2022   ........... H04L 9/0822

OTHER PUBLICATIONS

Dong Pan, Gui-Lu, Liuguo Yin, Yu-Bo Sheng, Dong Ruan, Soon Xin Ng, Jianhua Lu, Lajos Hanzo; "The Evolution of Quantum Secure Direct Communication: On the Road to the Qinternet", IEEE Communications Surveys & Tutorials; Aug. 23, 2024, vol. 26, Issue: 3, Journal Article, Publisher: IEEE; pp. 1898-1949.*

(Continued)

*Primary Examiner* — Shewaye Gelagay
*Assistant Examiner* — Courtney D Fields (57) ABSTRACT

Various embodiments described herein generally relate to a method and system for secure distribution of symmetric encryption keys using quantum key distribution (QKD). In at least one embodiment, there is provided a method for secure communication, comprising: establishing one or more secure keys at a first and second ground station using a quantum key distribution (QKD) protocol; transmitting from the first station to the second station a plurality of encryption keys, wherein the transmitting comprises: encrypting, at the first station, the plurality of encryption keys using at least one of the one or more of secure keys to generate an encrypted batch of keys; transmitting the encrypted batch of keys to the second station; and decrypting, at the second station, the encrypted batch of keys using the at least one secure key to access the plurality of encryption keys.

17 Claims, 5 Drawing Sheets

(56) References Cited

U.S. PATENT DOCUMENTS

| | | | |
|---|---|---|---|
| 10,291,590 B2 | 5/2019 | Tanizawa et al. | |
| 11,251,947 B1 | 2/2022 | Wang et al. | |
| 2017/0324550 A1* | 11/2017 | Yuan | H04L 9/40 |
| 2018/0109371 A1 | 4/2018 | Wang et al. | |
| 2018/0109372 A1 | 4/2018 | Fu | |
| 2022/0006627 A1 | 1/2022 | Ko et al. | |
| 2022/0321333 A1* | 10/2022 | Wissel | H04L 9/0855 |
| 2023/0018829 A1* | 1/2023 | Cho | H04L 9/0825 |

OTHER PUBLICATIONS

Quantum Communications Hub, 2020, Free Space QKD, [online], Available from: https://www.quantumcommshub.net/ industry-government-media/our-technologies/free-space-qkd/ [accessed: Aug. 15, 2023].

* cited by examiner

METHOD AND SYSTEM FOR SECURE DISTRIBUTION OF SYMMETRIC ENCRYPTION KEYS USING QUANTUM KEY DISTRIBUTION (QKD)

CROSS-REFERENCE TO RELATED APPLICATIONS

The present application claims the benefit of the filing date of U.S. provisional patent application Ser. No. 63/320,500 filed on Mar. 16, 2022, the entirety of which is incorporated herein by reference.

FIELD

The present subject-matter relates to symmetric key encryption, and more particularly, to a method and system for secure distribution of symmetric encryption keys using quantum key distribution (QKD).

INTRODUCTION

The following is not an admission that anything discussed below is part of the prior art or part of the common general knowledge of a person skilled in the art.

Secure electronic data communication is often assured through the use of various encryption algorithms. Encryption prevents unscrupulous third parties from eavesdropping on data communication channels with a view to intercepting the communicated data.

A common and oft-used encryption algorithm is asymmetric key encryption (also known as public-key encryption). It has been appreciated, however, that the security of asymmetric key encryption relies on the inability of modern computing technology to solve what is known as the "prime number factorization problem", which forms the basis of public and private key generation. In particular, solving the prime number factorization problem is thought to be mathematically improbable, although this conjecture remains unproven. Currently, the only known conceivable method requires significant computational and processing power, which is unavailable with current computing technologies. For this reason, messages encrypted using asymmetric key encryption are believed to be secure against a brute force computation using modern (i.e., digital) computers.

The advent of quantum computers, however, has posed a considerable threat to the security of asymmetric key encryption. Quantum computers, which make use of the entanglement of quantum states, offer vastly greater computational power for certain classes of problems. One of the problems that a quantum computer is able to attack is the prime number factorization problem. For example, using Shor's algorithm, it would be possible for quantum computers to solve the prime number factorization problem, and in turn, decipher and decrypt asymmetric encrypted messages.

To this end, an alternative encryption method for securing data communication channels is symmetric key encryption. Symmetric encryption relies on a single, private key—shared between parties—to encrypt and decrypt messages. As the private key is not generated based on multiplied prime numbers, the key cannot be resolved by third parties using mathematical algorithms.

Keys used in symmetric key encryption can be numerically as long as desired or practical. Currently, 128 bit and 256 bit keys are used in the Advanced Encryption Standard (AES). AES encryption, with long keys and multiple-round implementations, are exceedingly unlikely to be broken. Even small key lengths (e.g., 128 bits) would take an extraordinarily long period of time (e.g., billions of years) on current and foreseeable digital computer hardware and further require storage of large volumes of data (e.g., trillions of terabytes). For this reason, among other, it is believed that the use of symmetric keys is the most viable option for countering the threat posed by quantum computers.

It has been appreciated, however, that the use of symmetric encryption relies on a priori knowledge of the shared private key as between communicating parties. This presents a unique question of how to perform the initial exchange (i.e., sharing) of the symmetric key, without the key itself being intercepted by a third-party. This has always been considered to be the fundamental problem with shared key encryption. In high security applications, resolving a way of exchanging symmetric keys in a secure manner therefore becomes the fundamental problem to resolve.

SUMMARY OF THE VARIOUS EMBODIMENTS

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In a broad aspect, there is provided a method for secure communication, comprising: establishing one or more secure keys at a first ground station and a second ground station using a quantum key distribution (QKD) protocol; transmitting from the first ground station to the second ground station a plurality of encryption keys, wherein the transmitting comprises: encrypting, at the first ground station, the plurality of encryption keys using at least one of the one or more of secure keys to generate an encrypted batch of keys; transmitting the encrypted batch of keys to the second ground station; and decrypting, at the second ground station, the encrypted batch of keys using the at least one secure key to access the plurality of encryption keys.

The QKD protocol may include one of a BB84 QKD protocol and a BBM92 QKD protocol.

The QKD protocol can use a terrestrial fiber-based optical link.

Establishing the one or more secure keys can include: establishing a first secure key between the first ground station and a satellite using a first space-based QKD link, where the first secure key is associated with the first ground station; establishing a second secure key between the second ground station and the satellite using a second spaced-based QKD link, where the second secure key is associated with the second ground station; receiving at at least one of the first ground station and the second ground station a combined key from the satellite, where the combined key is generated by combining the first and second secure keys, where the ground station receiving the combined key is a key-receiving station; and extracting, at the at least one key-receiving station, the key associated with the other station from the combined key.

The combined key can be generated on the satellite by XOR'ing the first and second keys.

Before the transmitting of the plurality of encryption keys, the method can further include: generating, at the first ground station, the plurality of encryption keys.

The plurality of encryption keys can be generated by a random key generator at the first ground station.

After decrypting at the second ground station the encrypted batch of keys, the method can further include: encrypting, at one of the first ground station and the second ground station, one or more data messages using one or more encryption keys of the plurality of encryption keys to generate one or more respective encrypted messages; transmitting, the encrypted messages to the other ground station; decrypting, at the other ground station, the encrypted messages using the one or more encryption keys of the plurality of encryption keys.

Transmitting the encrypted batch of keys can occur using one or more of a radio frequency (RF), wireless, microwave, radio, millimeter wave, terahertz wave, shortwave satellite, fiber optic cable, terrestrial wire and cable medium.

The first ground station can be configured to encrypt data messages transmitted at different times with different encryption keys of the plurality of encryption keys.

The first ground station can be configured to use a one-time pad technique to encrypt different characters in the same data message with different encryption keys.

The second ground station can be configured to decrypt a received encrypted message using the corresponding encryption key, of the plurality of encryption keys, based on a priori knowledge of the encryption key used to encrypt the message by the first ground station.

In a broad aspect, there is provided a method for secure communication, comprising: establishing, at a first ground station in communication with a second ground station, one or more secure keys using a quantum key distribution (QKD) protocol between the first ground station and the second ground station; transmitting from the first ground station to the second ground station a plurality of encryption keys, wherein the transmitting comprises: encrypting, at the first ground station, the plurality of encryption keys using at least one of the one or more of secure keys to generate an encrypted batch of keys; and transmitting the encrypted batch of keys to the second ground station, wherein the encrypted batch of keys is decryptable at the second ground station using the at least one secure key to access the plurality of encryption keys.

The QKD protocol can include one of a BB84 QKD protocol and a BBM92 QKD protocol.

The QKD protocol can use a terrestrial fiber-based optical link.

Establishing the one or more secure keys can include: establishing a first secure key between the first ground station and a satellite using a first space-based QKD link, where the first secure key is associated with the first station; receiving at the first ground station a combined key from the satellite, where the combined key is generated by combining the first secure key and a second secure key, where the second secure key is established between the second ground station and the satellite using a second spaced-based QKD link; and extracting, at the first ground station, the second secure key from the combined key.

The combined key can be generated on the satellite by XOR'ing the first secure key and the second secure key.

Before the transmitting of the plurality of encryption keys, the method can further include: generating, at the first ground station, the plurality of encryption keys.

The plurality of encryption keys can be generated by a random key generator at the first ground station.

In a broad aspect, there is provided a ground communication terminal comprising: a processor; a communication interface operable to establish a communication channel with a second ground communication terminal; and non-transitory storage memory, wherein the non-transitory storage memory stores instructions for configuring the processor to: establish one or more secure keys with the second ground communication terminal over the communication channel using a quantum key distribution (QKD) protocol; transmit a plurality of encryption keys to the second ground communication terminal by: encrypting the plurality of encryption keys using at least one of the one or more of secure keys to generate an encrypted batch of keys; and transmitting the encrypted batch of keys to the second ground communication terminal, wherein the encrypted batch of keys is decryptable at the second ground communication terminal using the at least one secure key to access the plurality of encryption keys It will be appreciated by a person skilled in the art that a system, device, method or computer program product disclosed herein may embody any one or more of the features contained herein and that the features may be used in any particular combination or sub-combination. Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Further aspects and features of the examples described herein will appear from the following description taken together with the accompanying drawings.

DESCRIPTION OF VARIOUS EMBODIMENTS

Numerous examples are described in this application, and are presented for illustrative purposes only. The described examples are not intended to be limiting in any sense. The invention is widely applicable to numerous examples, as is readily apparent from the disclosure herein. Those skilled in the art will recognize that the present invention may be practiced with modification and alteration without departing from the teachings disclosed herein. Although particular features of the present invention may be described with reference to one or more particular examples or figures, it should be understood that such features are not limited to usage in the one or more particular examples or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

As used herein and in the claims, a first element is said to be "received" in a second element where at least a portion of the first element is received in the second element unless specifically stated otherwise.

Some elements herein may be identified by a part number, which is composed of a base number followed by an alphabetical or subscript-numerical suffix (e.g. 112$a$, or 112$_1$). Multiple elements herein may be identified by part numbers that share a base number in common and that differ by their suffixes (e.g. 112$_1$, 112$_2$, and 112$_3$). All elements with a common base number may be referred to collectively or generically using the base number without a suffix (e.g. 112).

The advent of quantum computers presents a significant threat to traditional asymmetric encryption techniques. The use of symmetric key encryption techniques, such as the AES standard by way of example, is believed to be a viable option for countering the threat posed by quantum computers. The use of symmetric encryption, however, relies on a priori knowledge of the symmetric key between communicating parties. That is, both parties must already be in possession of a known secure key that has not been compromised, copied or stolen. This, in turn, presents a unique problem of how to securely exchange the symmetric keys, without the key itself being intercepted by a third-party.

To this end, it has been appreciated that quantum key distribution (QKD) techniques offer a solution to the problem of generating symmetric keys in a secure manner between multiple communicating terminals.

Figure 1A:
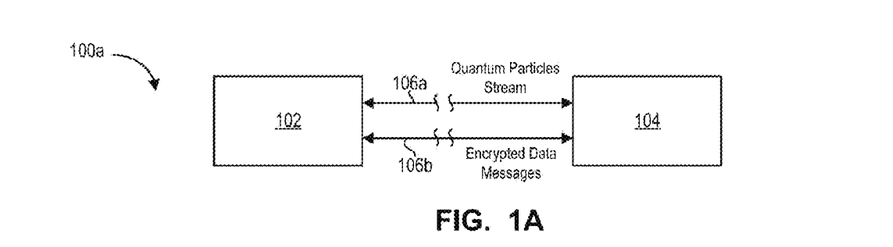
FIG. 1A is block diagram of an example communication system.

Reference is now made to FIG. 1A, which shows a simplified illustration of an example communication system 100$a$.

As shown, the system 100$a$ includes a first communication terminal 102 and a second communication terminal 104, each which communicate encrypted data messages through communication channel 106$b$. Communication channel 106$b$ may comprise any suitable communication medium. For example, communication channel 106$b$ may comprise an air medium enabling radio-frequency (RF), digital, analog, or optical communication. In other cases, communication channel 106$b$ can comprise a wire or cable, such as a cable adapted for analog or digital communication, or low frequency electrical signals, or otherwise optical communication.

Data messages exchanged between terminals 102, 104 are secured by encrypting the data messages using a symmetric encryption key. Using symmetric key encryption, each of the terminals 102, 104 may have access to a common and shared private key. The data messages may then be encrypted and decrypted using this shared private key.

In the system 100$a$, the symmetric keys are initially generated using a quantum key distribution (QKD) method. QKD can be used to address the problem of how to securely establish the symmetric key, while avoiding interception or copying of the information bits, used to create the key, by unscrupulous third parties. The laws of quantum physics render an impossibility any interception of the photon stream, without being detected by the communicating parties.

More particularly, QKD relies on principles of quantum physics to "exchange" photon state between two parties. Photons, or other quantum particles, exchanged via QKD cannot be resolved by third parties insofar as the laws of quantum physics hold constant. To enable QKD, a communication channel 106$a$ adapted for optical communication is provided between terminals 102, 104. In most cases, this channel comprises a terrestrial photonic optical cable link between the terminals. Channel 106$a$ may be the same channel, or a different channel, than channel 106$b$.

As illustrated, in the QKD process, the first terminal 102 may initially transmit a sequence of particles, prepared in random quantum states. The first terminal 102 may establish an understanding of the symmetric key with the second terminal 104 via the optical link 106$a$, using a QKD protocol. Various QKD protocols are known in the art, including BB84, E91, BBM92, T12, decoy state, SARG04, six-state, B92, MSz96, COW (Coherent One-Way), DPS (Differential-Phase-Shift), KMB09, HQDQKD (High-Dimensional Quantum Key Distribution) and time bin encoding protocols. Once the symmetric key is established with the second terminal 104, each of the first and second terminals 102, 104 may subsequently encrypt and decrypt messages via the shared symmetric key. In cases where channel 106$a$ is adapted for optical transmission, then channels 106a and 106b may be the same channel.

In system 100a, QKD protocols are performed terrestrially, via terrestrial optical cables 106a coupling stations 102 and 104. Performing QKD using fiber optic cables can, however, present a number of challenges. One significant challenge is that QKD is prevented from occurring over long distances using fiber optic cables. This is primarily owing to significant attenuation loses through the extended lengths of optical fiber cable. Accordingly, a terrestrial-based QKD technique may not enable secure exchange of keys where terminals 102, 104 are positioned far from each other. Even through the air optical links, the links are constrained in distance by the curvature of the earth.

Performing QKD through free-space optical (FSO) mediums between earth orbit and ground, or ground and earth orbit, may mitigate this problem. FSO links to earth orbit do not suffer from the same attenuation losses evident in fiber optic cables, as the thickest and most lossy part of earth's atmosphere, the troposphere, is only several kilometers thick, and therefore enables QKD to be performed over large distances between ground and orbit, or orbit and ground. Accordingly, there are significant opportunities to perform QKD using satellites deployed in space, which can enable exchange of symmetric keys between terminals positioned across large geographic distances.

Figure 1B:
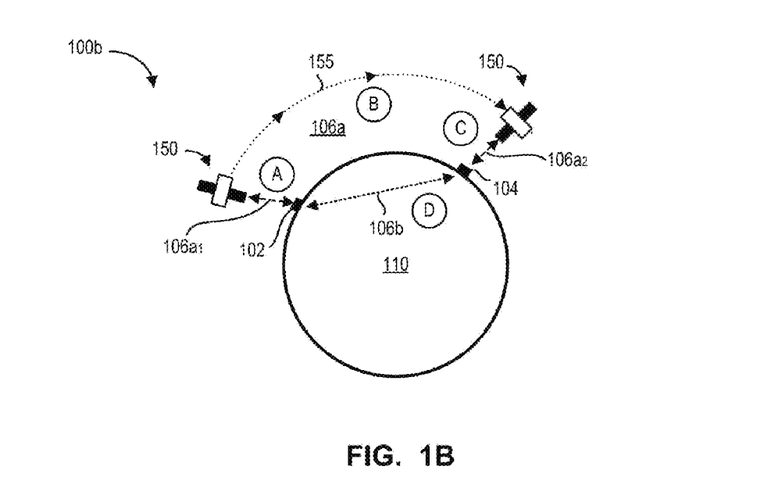
FIG. 1B is a diagram showing an example of a communication system using an orbiting satellite and spaced-based quantum key distribution (QKD), to generate encryption keys between the satellite and two ground stations.

Reference is made to FIG. 1B, which shows an example communication system 100b which uses a satellite to perform spaced-based QKD.

As shown, using a satellite, an example QKD protocol for exchanging a symmetric key between terminals 102 and 104 (also referred to as ground stations 102 and 104) may occur as follows: (a) initially, first terminal 102 may establish a secure key "A" with a passing satellite 150 via a first QKD link 106a1; (b) subsequently, the satellite 150 may continue along its orbital trajectory 155 around ground (i.e., earth) 110, until it is within the periphery for communication with second terminal 104; (c) the satellite 150 may then initiate a second QKD link 106a2 to establish a second secure key "B" with second terminal 104. The satellite 150 may then combine secure key "A" with secure key "B" (e.g., using an XOR operation), and may transmit the combined key "C" back to the second terminal 104 (or to the first terminal 102), or both using a radio or optical link as required. The second terminal 104 (or first terminal 102), may then resolve keys "A" and key "B", by reversing the combining operation (e.g., XOR operation) in combined key "C" and with knowledge of the key that is currently known to that station (i.e., key A or key B) In this manner, one or both stations now have access to symmetric key "A" and "B"; and (d) one, or both of the symmetric keys can then be used to encrypt and exchange any other data message, via any other communication channel 106b. In some cases, there may be an advanced pre-agreement on which of the symmetric keys "A" and "B" to use for subsequent communication.

Figure 1C:
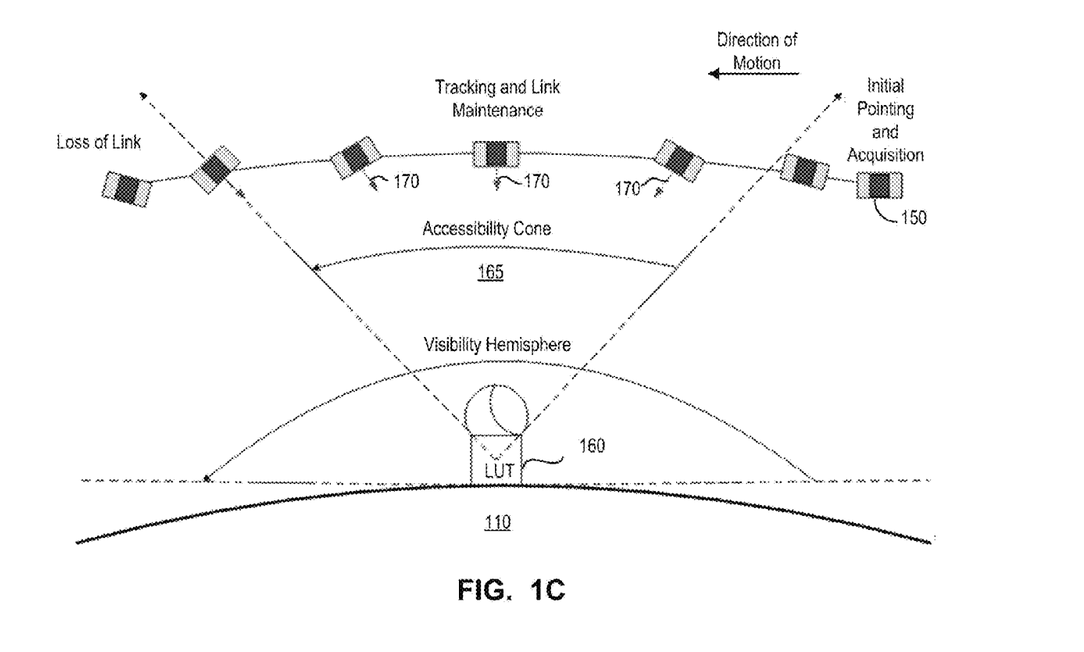
FIG. 1C is an illustration of a satellite pass over an optical ground terminal station.

As best shown in FIG. 1C, in communicating with a ground terminal 160 (e.g., a local user terminal (LUT)), each ground terminal 160 may have a limited window of opportunity through which it may establish the quantum link prior to the satellite orbiting out of the connection periphery (also known as the accessibility cone 165). In FIG. 1C, the quantum link is illustrated by transmission arrows 170 from satellite 150 (i.e., space to ground transmission), although it will be understood that the quantum link may also include reverse ground to space transmission. The accessibility cone 165 may only last for a minor duration of time, such as for example a few minutes (e.g., 3 to 4 minutes). In cases where there are unfavorable weather conditions during this brief duration of time (e.g., clouds obstructing the optical link), the QKD link will not be established and may be delayed until the next orbital pass of the satellite.

Here, it has also been appreciated that, in various application contexts, it may be insufficient for only one or two symmetric keys (e.g., keys "A" and "B" or a combined key "C") to be used for encrypting data messages. For example, in high security applications (e.g., military applications), it may be necessary that each separate exchanged message be encrypted with a unique symmetric key. In turn, this obviates the likelihood that a third party may resolve (or intercept) a single symmetric key, and subsequently intercept and decrypt all exchanged messages. Rather, the third-party must intercept or resolve each separate unique key in order to decrypt each exchanged message. Further, the third-party must additionally determine which messages are encrypted using which keys. In some cases involving very high security applications, it may be necessary that each separate character, within a single message, be encrypted with a unique symmetric key and the keys are never reused again. This technique is also often referred to as a "one-time-pad".

Currently, to facilitate secure exchange of a large number of symmetric keys, it is necessary for terminals 102 and 104 to undergo a separate space-based QKD process for each new key (i.e., FIG. 1B). For example, depending on the rate of data messages exchanged between terminals 102, 104— as well as the desired frequency at which keys are alternated to encrypt different messages—it may be necessary for terminals 102, 104 to exchange hundreds, thousands, hundreds of thousands or potentially millions of unique symmetric keys. In turn, an equal number of spaced-based QKD exchanges are required to establish an equal number of symmetric keys.

Yet, performing hundreds, thousands, hundreds of thousands or millions of spaced-based QKD exchanges is impractical owing to both temporal and monetary costs. For example, using a single satellite, a new orbital pass is required for each new symmetric key established through the spaced-QKD protocol. Accordingly, exchanging a large number of symmetric keys requires the satellite to complete, at a minimum, an equal number of orbits around earth. For polar orbiting, low earth orbit (LEO) satellites, sets of passes over a particular ground station may be spaced up to twelve or more hours apart. Further, within each orbit, favorable weather conditions are required to enable communication during that orbit.

While it may be possible to mitigate this problem by deploying a multitude of satellites (e.g., each satellite delivering a single key per pass), there are significant costs associated with each new deployed satellite. Still further, exchanging a large number of keys (e.g., millions) in a reasonable time period may also still require deploying an inordinate number of continuously operating satellites. Further, this situation can also pose dire consequences of orbital debris, collisions, and increased number of failures due to increased system complexity.

In view of the foregoing, there is a desire for a method and system for enabling efficient and secure exchange of a large number of symmetric keys between terminals using spaced-based QKD.

Figure 2:
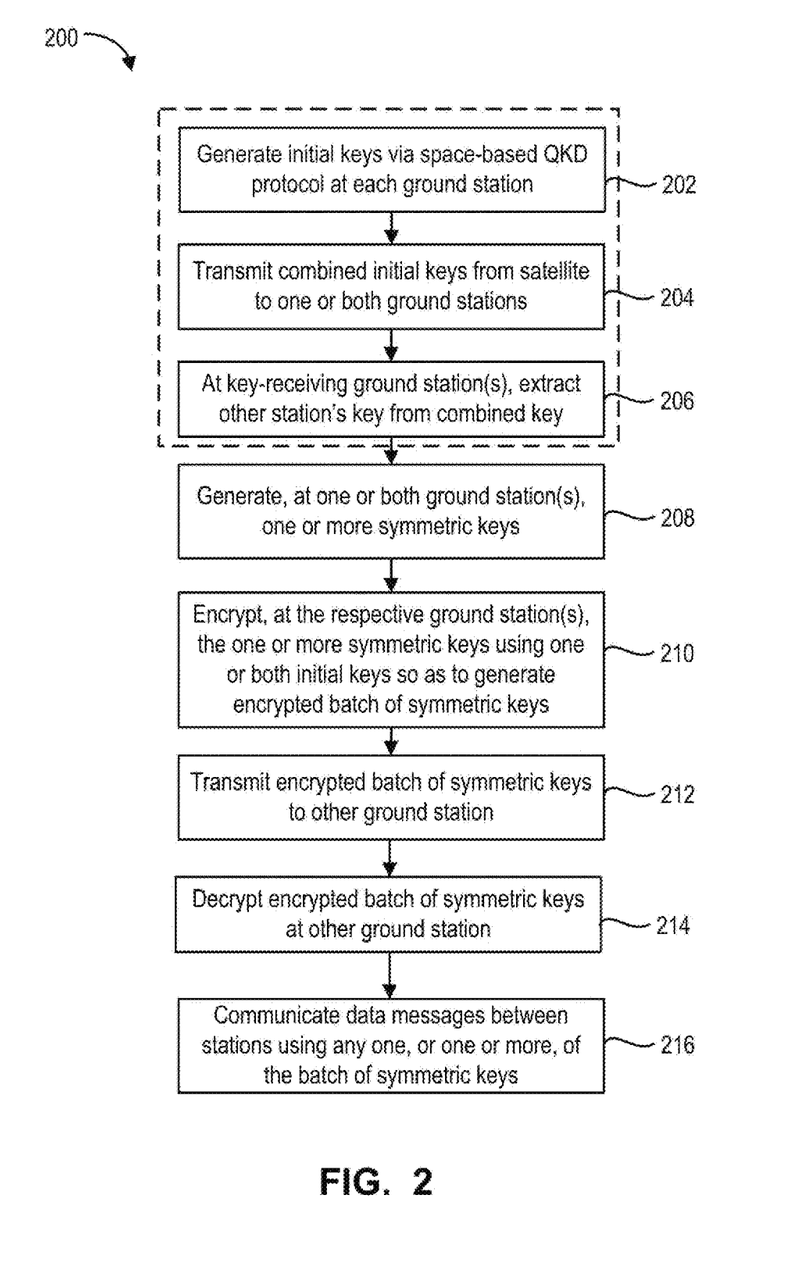
FIG. 2 is a process flow for an example method for secure distribution of symmetric encryption keys using space-based QKD.

Reference is now made to FIG. 2, which shows a process flow for an example method 200 for exchanging symmetric encryption keys using a spaced-based QKD technique. Concurrent reference is also made to FIG. 3, showing method 300, which is an example of method 200 of FIG. 2.

As shown in method 200, at 202, initial keys are generated using a space-based QKD protocol. More particularly, as explained previously with respect to FIG. 1B, the space-based QKD can be used to establish an initial secure key "A" between first ground station 102 and satellite 150 (302a and 302b in FIG. 3), as well as establishing initial secure key "B" between second ground station 104 and satellite 150 (306a and 306b in FIG. 3). Each of secure keys "A" and "B" can be stored on the satellite 150 (304a and 308a in FIG. 3), as well as in each respective station (304b and 308b in FIG. 3). For example, the keys can be stored on a memory associated with each of the satellite 150, and stations 102, 104.

At 204, the initial keys "A" and "B", established at act 202, may be combined on the satellite 150 to generate combined key "C". For example, as previously described, this can be performed by XOR'ing keys "A" and "B" to generate combined key "C" (310 in FIG. 3). Combined key "C" is then transmitted from satellite 150 to one or both of the first and second ground stations 102, 104. The transmitting may occur, for example, using one of a radio or optical link. A station receiving the combined key "C" may be referred to herein as the "key-receiving station".

Figure 3:
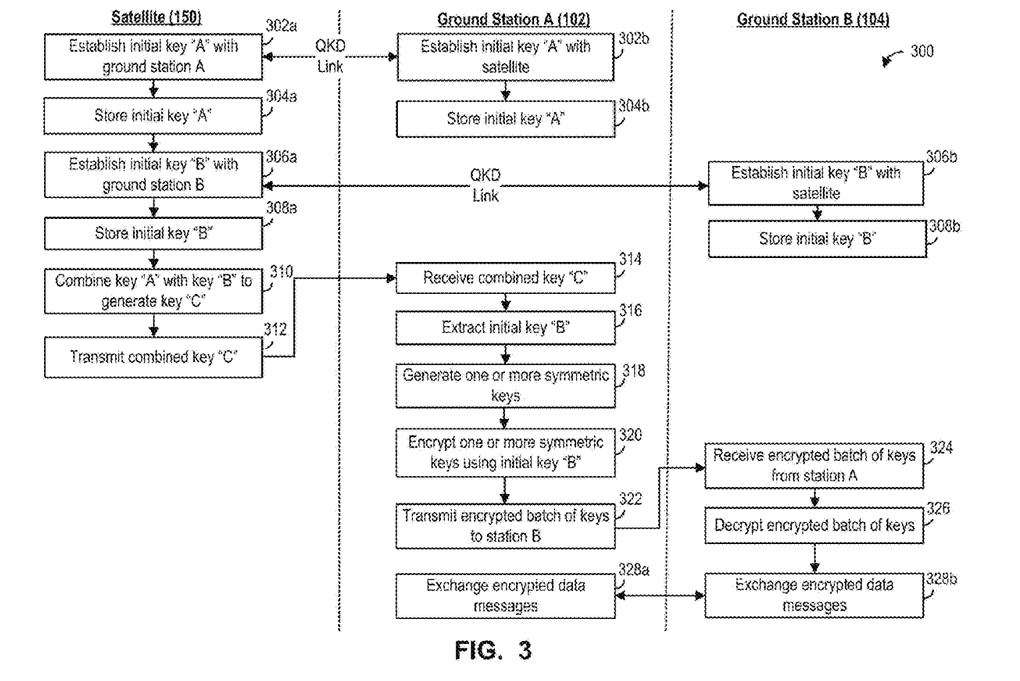
FIG. 3 is also a process flow for an example method for secure distribution of symmetric encryption keys using space-based QKD.

In FIG. 3, for sake of simplicity of explanation, it is assumed that the combined key "C" is transmitted only to the first ground station 102. In this manner, only the first station 102 is the key-receiving station (312 and 314 in FIG. 3). It will be understood, however, that the combined key "C" may also be transmitted to the second station 104, i.e., in addition to, or in the alternative of, transmitting to the first station 102.

At 206, at the key-receiving station(s), the other station's secure key is extracted from the combined key "C" (316 in FIG. 3). For example, in FIG. 3, where the first station 102 receives the combined key "C"—the first station 102 may extract the second station's key "B" by reversing the XOR operation with knowledge of the first station's stored key "A". In this manner, the first station 102 now has access to the second station's secure key "B", in addition to its own secure key "A".

In other examples, as explained, combined key "C" may be transmitted to the second station 104. Accordingly, a similar process is performed at the second station 104 to resolve the first station's secure key "A". That is, the second station 104 can reverse the XOR operation of the combined key "C" to determine the first station's key "A". In this manner, the second station 104 may also have access to the first station's secure key "A", in addition to its own secure key "B".

Provided that at least one station has access to both keys "A" and "B", at least one of the keys can be used to encrypt further data messages. For example, where only the first station 102 has access to both keys "A" and "B", the first station may use key "B"—which is now known to both the first and second stations 102, 104—to encrypt further messages. Second station 104 may then decrypt these messages using the secure key "B". Alternatively, if both stations 102, 104 have access to keys "A" and "B"—i.e., as both stations received combined key "C", thereby allowing extracting the other station's key—then one or both of keys "A" and "B" may be used to encrypt further messages. Here, the stations may agree on which of key "A" and/or key "B" to use to encrypt further data messages.

At 208, one or more further symmetric encryption keys may be generated at one or more of the stations 102, 104. For example, in method 300, the first station 102 may generate the one or more symmetric encryption keys at act 318.

Any number of symmetric keys can be generated at act 208. For example, a plurality of encryption keys may be generated (e.g., thousands, hundreds of thousands, etc.). In some cases, the plurality of encryption keys are generated using a source of entropy, such as to randomize the plurality of keys. This, in turn, can enhance the security of the system by preventing the keys from being interrelated by a patterned relationship. That is, the randomization of the keys prevents the possibility that a third party may access one key and resolve the remaining keys by determining an interrelationship pattern between the keys. In some cases, radioactive decay may be used as the source of entropy for generating randomized symmetric keys. Each generated symmetric key may correspond to a sequence string of binary numbers.

At 210, the one or more symmetric keys (herein referred to also as a batch of symmetric keys)—generated at one or both of the stations—are collectively packaged as a single data message encrypted using one or both of the initial secure keys "A" and "B" established at act 202. At 212, the encrypted batch of keys are then transmitted to the other ground station, such as to be decrypted by the other ground station at act 214.

For example, at act 320 in method 300, the batch of symmetric keys can be encrypted at the first station 102 using the initial key "B". Initial key "B" is known to both the first and second stations 102, and therefore can be used as a common encryption key for the batch of keys. The encrypted batch of keys is then transmitted to, and received by, the second station 104 (acts 322 and 324 in method 300). Second station 104 may then decrypt the batch of keys using the secure key "B". In this manner, the second station 104 now also has access to the batch of keys, such that the batch of symmetric keys is known to both stations "A" and "B".

It will be appreciated that, in the specific example of method 300, the batch of keys could not be encrypted using initial key "A". This is because, in this example, key "A" is only known to the first station 102 and not known to the second station 104. More particularly, as second station 104 did not receive the combined key "C", the second station 104 could not extract key "A". Nevertheless, it is possible for the first station 102 to include key "A" in the batch of keys at 318. That is, key "A" may still be communicated to second station 104, indirectly as part of the batch of keys.

It will also be further appreciated, that in another example, where both stations 102, 104 are key-receiving stations at act 206 (i.e., both stations receive combined key "C")—then both keys "A" and "B" are accessible to each station (i.e., each station 102, 104 is able to reverse combined key "C" to resolve the other station's key). Accordingly, in these example cases—it is possible, at act 210, to encrypt the batch of keys using one or both of keys "A" and "B", as both keys are known to each station. Optionally, an initial pre-agreement between stations 102, 104 may facilitate a decision as to which, or both, of keys "A" and "B" is to be used for encrypting the batch of keys. For example, stations 102 and 104 may use ordinary communication channels to decide which of one, or both, of keys A and B to use to encrypt/decrypt the batch of keys.

As should be apparent, at acts 210 (FIG. 2) and 320 (FIG. 3), it is not necessary to generate only a single batch of encryption keys. For example, multiple batches of symmetric keys may be generated. These batches of symmetric keys can be transmitted to the other station concurrently or separately, and using the same or different communication channels.

Multiple batches of symmetric keys that are encrypted using different keys may also be generated. This can be done, for example, to enhance security. For instance, (i) first station 102 may generate a first batch keys, which is encrypted using secure key "A" and/or "B". This first batch of keys may be transmitted to the second station 104; (ii) subsequently, first or second stations 102, 104 may generate a second batch of keys, which is encrypted using either secure key "A" and/or "B", and/or one of the keys in the first batch of keys (i.e., now known to both stations). For example, stations 102 and 104 may pre-agree to encrypt further batches of keys using one of the keys in the initial encrypted batch. Accordingly, it will be understood that once the initial batch of keys are generated and transmitted, there are various possibilities in respect of encrypting and securely transmitting further batches of keys.

At 216 of method 200, the first and second terminal may now communicate various data, voice, or video messages encrypted using any one, or one or more of the batch of symmetric keys (see also 328a and 328b in method 300). For example, the first and second terminals 102, 104 may use a new symmetric key for each exchanged data message, or may use a unique symmetric key for each character within each exchanged data message if the security required is extreme (i.e., also known as a "one time pad"). To this end, the encrypted communication between the terminals may also occur using any communication channel 106b (e.g., radio frequency (RF), wireless, microwave, radio, millimeter wave, terahertz wave, shortwave satellite, fiber optic cable, terrestrial wire and cable, etc.).

The first and second terminals may also have a pre-agreement on the order in which encrypted keys are to be used for encryption and decryption during act 216. That is, each station may have advanced knowledge of which key, of the batch of keys, is to be used at a given time to encrypt and decrypt further communicated messages.

For instance, the keys—within the encrypted batch—may be sequentially ordered within the batch according to their preferred order of use. That is, the order of use of the keys may be simply expressed based on their ordered arrangement within the batch. For instance, the first key in the batch may be used first, followed by the second key, and so forth. Accordingly, each station may determine the order of use of the keys based on the ordering of the keys within the batch.

Alternatively, rather than ordering the keys sequentially, the keys can be ordered in any other pre-agreed arrangement. For instance, in one example case, the order in which the keys are used can be determined using a random number generator. The random number generator can determine a random order in which the keys, in the batch of keys, are to be used. In some cases, the random number generator can be seeded using a pre-agreed "Nth" key in the initial batch of keys.

Alternatively or in addition, the ordering may be specified in the same, or a different, message. For example, at act 210, in addition to encrypting the batch of keys—the encrypted message may also include information on the order in which the keys should be used (i.e., whether a sequential or randomized order). This information can be included, for example, in the message header.

Alternatively, the ordering information may be packaged in a separate message all together, which is transmitted from the first to the second terminal through the same or different communication medium. That is, a supplementary message may be generated which includes an indication of the order in which the keys are to be used, and such a message may also be optionally encrypted using the initial secure keys established at act 202. This message may then be transmitted from the first terminal 102 to the second terminal 104.

Alternatively, the supplementary message can be encrypted and transmitted by the first terminal 102 using one of the batch of keys transmitted at act 208. For example, the supplementary message can be encrypted using the first key located in the batch. Further, the second terminal 104 may be configured, ahead of time, to decrypt the supplementary message based on the first key in the batch. The supplementary message can then include information on the order in which to use the remaining keys in the batch to communicate further data messages.

In addition to agreeing on the order in which the keys are used, the first and second terminals may also pre-agree on when to alternate (i.e., change) use of keys, in accordance with the pre-determined order.

For example, the keys may be alternated with each exchanged data message. That is, each station may be pre-configured to alternate to the next key, in the ordered sequence of keys, with each new sent or received message. Accordingly, each station may track the number of exchanged messages to determine which key to use for encrypting the next transmitted message, or decrypting the next received message.

Alternatively or in addition, the keys can be alternated based on temporal considerations. For example, the key can be alternated based on the time of day the messages are exchanged. For example, the key can be alternated at pre-determined frequencies or time intervals within the day. That is, different keys can be used at different times of day.

Alternatively or in addition, the keys can be alternated in response to a trigger event. For example, the trigger event may involve one terminal communicating a pre-defined encrypted or unencrypted signal to the other terminal, using any communication medium, prompting an alternation of the key being used.

Optionally, the agreement in respect of when to alternate use of the keys can be pre-configured into each terminal, or otherwise, can be indicated in the encrypted message at 210 or in another supplementary exchanged message.

In contrast to conventional systems, the present disclosure uses the initial secure keys (i.e., keys "A" and/or "B") to encrypt and exchange further symmetric keys. As the initial keys are established through a highly secure QKD process, the remaining symmetric keys can be securely encrypted and exchanged using the initial secured keys. This, in turn, solves the problem of how to securely exchange a large number of symmetric keys between two or more stations.

Further, using the disclosed methods, the batch of symmetric keys can be exchanged using only a single encrypted message passed from the first terminal to the second terminal. In this manner, it is not necessary to perform a new QKD exchange to securely establish each new key. Rather, a large volume of keys may be conceivably exchanged through only a single orbital pass of a single satellite conducting the QKD process in acts 202 to 206. Accordingly, the method 200 provides an efficient and cost-effective manner of securely distributing any desired quantity of keys (e.g., potentially millions or billions of keys), with no additional temporal or monetary costs.

Still further, as the batch of keys may be generated randomly (e.g., using a source of entropy), the distributed keys may not only be securely exchanged, but third parties are prevented from deciphering the entire, or a portion of, the batch of keys with knowledge of some of the keys (e.g., based on a pattern relationship between the keys).

While methods 200 and 300 have been described herein using a space-based QKD to establish the initial keys (acts 202-206 in method 200, and 302-306 in method 300)—it will be understood that the methods may be performed using any other type of QKD process or system. For example, the initial keys can be established using a terrestrial-based QKD system (e.g., via optical fiber cables in a short range fiber QKD network). The initial keys, established through a terrestrial-based QKD system, can then be used to perform the remaining portions of method 200 (i.e., acts 208-216) and method 300 (i.e., acts 318-328).

Still further, while the methods 200 and 300 have been described herein in respect of establishing keys and communication between only two (i.e., a pair) of ground stations—it will be understood that the described methods may be applied to any desired number of ground stations (or communication nodes) via multiple pair groupings, i.e., the methods may be performed separately between any number of pairs of ground stations/nodes, within the larger set.

Figure 4A:
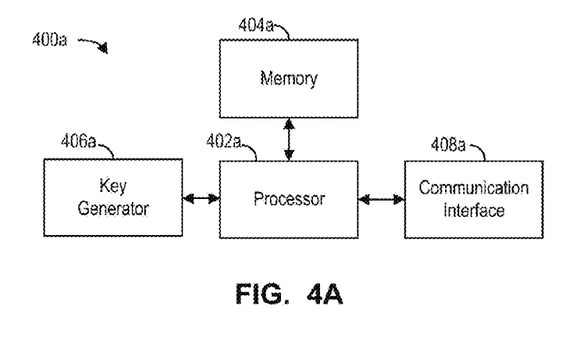
FIG. 4A is a simplified hardware block diagram of an example ground station.
Figure 4B:
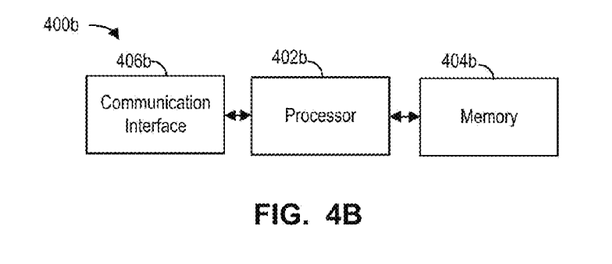
FIG. 4B is a simplified hardware block diagram of an example satellite.

Reference is now made to FIGS. 4A and 4B, which show simplified hardware block diagrams of an example ground station 102, 104 (FIG. 4A) and satellite 150 (FIG. 4B).

Referring first to block diagram 400a of FIG. 4A—as shown, a ground station 102, 104 may comprise a processor 402a coupled to one or more of a memory 404a, communication interface 408a and key generator 406a.

Processor 402a is a computer processor, such as a general purpose microprocessor. In some other cases, processor 402a may be a field programmable gate array, application specific integrated circuit, microcontroller, or other suitable computer processor.

Processor 402a is coupled, via a computer data bus, to memory 402b. Memory 402b may include both volatile and non-volatile memory. Non-volatile memory stores computer programs consisting of computer-executable instructions, which may be loaded into volatile memory for execution by processor 402a as needed. It will be understood by those of skill in the art that references herein to ground stations 102, 104 as carrying out a function or acting in a particular way imply that processor 402a is executing instructions (e.g., a software program) stored in memory 402b and possibly transmitting or receiving inputs and outputs via one or more interfaces. Memory 402b may also store data input to, or output from, processor 402a in the course of executing the computer-executable instructions.

Memory 402b can be used to store a respective ground station's secure key (i.e., 304b, 306b in method 300), as well as storing a transmitted or received batch of symmetric keys for subsequent reference. Memory 402b can also store information on the order in which the batch of keys are to be used, as well as information on when to alternate use of these keys. Memory 402b can also store software that may enable the processor 402a to encrypt and decrypt messages, as well as perform operations to allow key extraction (i.e., act 316 in method 300).

Key generator 406a may be used to generate the batch of keys (act 318 in method 300). For example, the key generator 406a may be a source of entropy.

Communication interface 408a may be any suitable interface for optical or radio communication. The communication interface 408a may enable a station 102, 104 to communicate with satellite 150 to establish a QKD link.

Referring now to block diagram 400b of FIG. 4B, as shown, a satellite 150 may also comprise a processor 402b coupled to one or more of a memory 404b and a communication interface 406b. Processor 402b and memory 404b may be analogous to processor 402a and memory 404a. To this end, it will be understood by those of skill in the art that references herein to satellite 150 as carrying out a function or acting in a particular way imply that processor 402b is executing instructions (e.g., a software program) stored in memory 404b and possibly transmitting or receiving inputs and outputs via one or more interface. Memory 404b may also store data input to, or output from, processor 402a in the course of executing the computer-executable instructions.

Memory 404b can be used to store secure keys "A" and "B" (acts 304a and 308a in method 300), as well as executable software for causing the processor 402b to combine keys "A" and "B" to generate combined key "C".

While the above description provides examples of the embodiments, it will be appreciated that some features and/or functions of the described examples are susceptible to modification without departing from the spirit and principles of operation of the described examples. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A method for secure communication, comprising:
 establishing a secure key at a first ground station and a second ground station using a quantum key distribution (QKD) protocol, wherein once established the secure key is a symmetric key available at both the first ground station and the second ground station;
 generating, at the first ground station, a plurality of encryption keys, wherein the plurality of encryption keys are independent from the secure key, the plurality of encryption keys are generated locally at the first ground station using a random key generator local to the first ground station and each encryption key in the plurality of encryption keys is a symmetric encryption key;
 transmitting from the first ground station to the second ground station the plurality of encryption keys, wherein the transmitting comprises:
  encrypting, at the first ground station, the plurality of encryption keys using the secure key to generate an encrypted batch of keys;
  transmitting the encrypted batch of keys to the second ground station; and
  decrypting, at the second ground station, the encrypted batch of keys using the secure key to access the plurality of encryption keys whereby each encryption key in the plurality of encryption keys is usable by the first ground station and the second ground station to exchange encrypted data using a symmetric key encryption technique;
 wherein establishing the secure key comprises:
  establishing a first initial key between the first ground station and a satellite using a first space-based QKD link, wherein the first initial key is associated with the first ground station;
  establishing a second initial key between the second ground station and the satellite using a second spaced-based QKD link, wherein the second initial key is associated with the second ground station;
  receiving by at least one of the first ground station or the second station a combined key from the satellite, wherein the combined key is generated by combining the first initial key and the second initial key, wherein the ground station receiving the combined key is a key-receiving station;

extracting, at the at least one key-receiving station, the initial key associated with the other station from the combined key; and selecting one of the first initial key and the second initial key as the secure key.

2. The method of claim 1, wherein the QKD protocol comprises one of a BB84 QKD protocol and a BBM92 QKD protocol.

3. The method of claim 1, wherein the QKD protocol uses a terrestrial fiber-based optical link.

4. The method of claim 1, wherein the combined key is generated on the satellite by XOR'ing the first initial key and the second initial key.

5. The method of claim 1, wherein after decrypting at the second ground station the encrypted batch of keys, the method further comprises:

encrypting, at one of the first ground station and the second ground station, one or more data messages using one or more encryption keys of the plurality of encryption keys to generate one or more respective encrypted messages;

transmitting, the encrypted messages to the other ground station;

decrypting, at the other ground station, the encrypted messages using the one or more encryption keys of the plurality of encryption keys.

6. The method of claim 1, wherein transmitting the encrypted batch of keys occurs using one or more of a radio frequency (RF), wireless, microwave, radio, millimeter wave, terahertz wave, shortwave satellite, fiber optic cable, terrestrial wire and cable medium.

7. The method of claim 1, wherein the first ground station is configured to encrypt data messages transmitted at different times with different encryption keys of the plurality of encryption keys.

8. The method of claim 1, wherein the first ground station is configured to use a one-time pad technique to encrypt different characters in the same data message with different encryption keys.

9. The method of claim 1, wherein the second ground station is configured to decrypt a received encrypted message using the corresponding encryption key, of the plurality of encryption keys, based on a priori knowledge of the encryption key used to encrypt the message by the first ground station.

10. The method of claim 1, wherein the random key generator comprises a source of entropy located at the first ground station.

11. A method for secure communication, comprising:

establishing, at a first ground station in communication with a second ground station, a secure key using a quantum key distribution (QKD) protocol between the first ground station and the second ground station, wherein once established the secure key is a symmetric key available at both the first ground station and the second ground station;

generating, at the first ground station, a plurality of encryption keys, wherein the plurality of encryption keys are independent from the secure key, the plurality of encryption keys are generated locally at the first ground station using a random key generator local to the first ground station and each encryption key in the plurality of encryption keys is a symmetric encryption key;

transmitting from the first ground station to the second ground station the plurality of encryption keys, wherein the transmitting comprises:

encrypting, at the first ground station, the plurality of encryption keys using the secure key to generate an encrypted batch of keys; and transmitting the encrypted batch of keys to the second ground station, wherein the encrypted batch of keys is decryptable at the second ground station using the secure key to access the plurality of encryption keys such that each encryption key in the plurality of encryption keys is usable by the first ground station and the second ground station to exchange encrypted data using a symmetric key encryption technique;

wherein establishing the secure key comprises:

establishing a first initial key between the first ground station and a satellite using a first space-based QKD link, wherein the first initial key is associated with the first station;

receiving at the first ground station a combined key from the satellite, wherein the combined key is generated by combining the first initial key and a second initial key, wherein the second initial key is established between the second ground station and the satellite using a second spaced-based QKD link;

extracting, at the first ground station, the second initial key from the combined key; and selecting one of the first initial key and the second initial key as the secure key.

12. The method of claim 11, wherein the QKD protocol comprises one of a BB84 QKD protocol and a BBM92 QKD protocol.

13. The method of claim 11, wherein the QKD protocol uses a terrestrial fiber-based optical link.

14. The method of claim 11, wherein the combined key is generated on the satellite by XOR'ing the first initial key and the second initial key.

15. The method of claim 11, wherein the random key generator comprises a source of entropy located at the first ground station.

16. A ground communication terminal comprising:

a processor;

a communication interface operable to establish a communication channel with a second ground communication terminal; and non-transitory storage memory, wherein the non-transitory storage memory stores instructions for configuring the processor to:

establish a secure key with the second ground communication terminal over the communication channel using a quantum key distribution (QKD) protocol, wherein once established the secure key is a symmetric key available at both the ground communication terminal and the second ground communication terminal;

generate a plurality of encryption keys, wherein the plurality of encryption keys are independent from the secure key, the plurality of encryption keys are generated locally at the ground communication terminal using a random key generator local to the ground communication terminal and each encryption key in the plurality of encryption keys is a symmetric encryption key;

transmit the plurality of encryption keys to the second ground communication terminal by:

encrypting the plurality of encryption keys using the secure key to generate an encrypted batch of keys; and transmitting the encrypted batch of keys to the second ground communication terminal, wherein the encrypted batch of keys is decryptable at the second ground communication terminal using the secure key to access the plurality of encryption keys such that each encryption key in the plurality of encryption keys is usable by the ground communication terminal and the second ground communication terminal to exchange encrypted data using a symmetric key encryption technique;

wherein the non-transitory storage memory stores instructions for configuring the processor to establish the secure key by:

establishing a first initial key between the ground communication terminal and a satellite using a first space-based QKD link, wherein the first initial key is associated with the ground communication terminal;

receiving a combined key from the satellite, wherein the combined key is generated by combining the first initial key and a second initial key, wherein the second initial key is established between the second ground communication terminal and the satellite using a second spaced-based QKD link;

extracting the second initial key from the combined key; and selecting one of the first initial key and the second initial key as the secure key.

17. The ground communication terminal of claim 16, wherein the random key generator comprises a source of entropy located at the ground communication terminal.

\* \* \* \* \*